US010616596B2

(12) United States Patent
Panusopone et al.

(10) Patent No.: US 10,616,596 B2
(45) Date of Patent: *Apr. 7, 2020

(54) UNEQUAL WEIGHT PLANAR PREDICTION

(71) Applicant: ARRIS Enterprises LLC, Suwanee, GA (US)

(72) Inventors: Krit Panusopone, San Diego, CA (US); Yue Yu, San Diego, CA (US); Seungwook Hong, San Diego, CA (US); Limin Wang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/856,617

(22) Filed: Dec. 28, 2017

(65) Prior Publication Data
US 2018/0184110 A1  Jun. 28, 2018

Related U.S. Application Data

(60) Provisional application No. 62/522,420, filed on Jun. 20, 2017, provisional application No. 62/482,178,
(Continued)

(51) Int. Cl.
*H04N 19/52* (2014.01)
*H04N 19/176* (2014.01)
(Continued)

(52) U.S. Cl.
CPC .......... *H04N 19/50* (2014.11); *H04N 19/105* (2014.11); *H04N 19/107* (2014.11); *H04N 19/11* (2014.11);
(Continued)

(58) Field of Classification Search
CPC ...... H04N 19/52; H04N 19/176; H04N 19/82; H04N 19/186; H04N 19/107
(Continued)

(56) References Cited

U.S. PATENT DOCUMENTS

2013/0329794 A1* 12/2013 Jeon ................ H04N 19/61
375/240.12

FOREIGN PATENT DOCUMENTS

EP  2728884 A2  5/2014
EP  2890130 A1  7/2015
(Continued)

OTHER PUBLICATIONS

PCT International Search Report & Written Opinion, RE: Application No. PCT/US2017/068682, dated Mar. 16, 2018.
(Continued)

*Primary Examiner* — Hee-Yong Kim
(74) *Attorney, Agent, or Firm* — Chernoff, Vilhauer, McClung & Stenzel, LLP

(57) ABSTRACT

A method of decoding JVET video includes receiving a bitstream and calculating a final planar prediction in planar mode to predict pixel values for a current coding block. The final planar prediction may rely on using unequal weights applied to each of a horizontal and vertical predictor, where such predictors may be generated by interpolating neighboring pixels for each predicted pixel within a coding block. The computation may be made more accurate by deriving a value for a bottom right neighboring pixel.

7 Claims, 16 Drawing Sheets

Related U.S. Application Data filed on Apr. 5, 2017, provisional application No. 62/459,797, filed on Feb. 16, 2017, provisional application No. 62/440,379, filed on Dec. 29, 2016, provisional application No. 62/439,724, filed on Dec. 28, 2016.

(51) Int. Cl.

| | | |
|---|---|---|
| H04N 19/82 | (2014.01) | |
| H04N 19/186 | (2014.01) | |
| H04N 19/107 | (2014.01) | |
| H04N 19/50 | (2014.01) | |
| H04N 19/182 | (2014.01) | |
| H04N 19/105 | (2014.01) | |
| H04N 19/96 | (2014.01) | |
| H04N 19/11 | (2014.01) | |
| H04N 19/593 | (2014.01) | |
| H04N 19/136 | (2014.01) | |
| H04N 19/59 | (2014.01) | |
| H04N 19/119 | (2014.01) | |
| H04N 19/126 | (2014.01) | |

(52) U.S. Cl.
CPC ......... *H04N 19/136* (2014.11); *H04N 19/176* (2014.11); *H04N 19/182* (2014.11); *H04N 19/186* (2014.11); *H04N 19/52* (2014.11); *H04N 19/59* (2014.11); *H04N 19/593* (2014.11); *H04N 19/82* (2014.11); *H04N 19/96* (2014.11); *H04N 19/119* (2014.11); *H04N 19/126* (2014.11)

(58) Field of Classification Search
USPC .................................................... 375/240.12
See application file for complete search history.

(56) References Cited

FOREIGN PATENT DOCUMENTS

| WO | 2012/035640 A1 | 3/2012 |
|---|---|---|
| WO | 2017/205701 A1 | 11/2017 |
| WO | 2017/205703 A1 | 11/2017 |

OTHER PUBLICATIONS

S. Yu, et al., "Distance-based weighted prediction for H.264 intra coding", Audio, IEEE Conference on Language and Image Processing, ICALIP 2008, Jul. 7, 2008.

K. Panusopone, et al., "Unequal Weight Planar Prediction and Constrained PDPC", 5th JVET Meeting, (The Joint Video Exploration Team of ISO/IEC JTC1/SC29/WG11 and ITU-T SG.16, Jan. 5, 2017.

J. Chen, et al., "Algorithm Description of Joint Exploration Test Model 5 (JEM5)", JVET-E1001-V2.

Y.-J. Chang, et al., "Arbitrary reference tier for intra directional modes," 3rd JVET Meeting, Geneva, JVET-C0043, May 2016, 3 pgs.

PCT International Search Report & Written Opinion, RE: Application No. PCT/US2017/034592, dated Aug. 16, 2017.

T. Shiodera, et al., "CE6 Subset A: Bidirectional Intra Prediction" (JCTVC-C079), 95th MPEG Meeting, Daegu, No. m18859, Jan. 20, 2011.

S. Matsuo, et al., "AGH7: Modification of Intra Angular Prediction Blending", 12th JTC-VC Meeting, 103rd MPEG Meeting, Geneva, No. JCTVC-L0128, Jan. 7, 2013.

K. Panusopone, et al., "Weighted Angular Prediction", 6th JVET Meeting, Hobart, JVET-F0104, Mar. 3-Apr. 7, 2017, 4 pgs.

Y. Lin, et al., "CE6.a: Report of Bidirectional UDI mode for Intra prediction", JCTVC-F509, Jul. 14, 2011.

K. Suehring, et al., "JVET Common Test Conditions and Software Reference Configurations", JVET-B1010, Feb. 2016.

PCT International Search Report & Written Opinion, RE: Application No. PCT/US2017/034594, dated Aug. 16, 2017.

Y. Ye, et al., "Improved H.264 Coding Based on Bi-directional Intra Prediction, Directional Transform , and Adaptive Coefficient Scanning", 15th IEEE Int'l Conference on Image Processing, Oct. 12, 2008, pp. 2116-2119.

K. Panusopone, et al., "Comparisons between UWP, W66 and Planar, Angular mode 66 under the same coding conditions", 7th JVET Meeting, Torino, JVET-G00xx, Jul. 13-21, 2017, 4 pgs.

PCT International Search Report & Written Opinion, RE: Application No. PCT/US2018/040862, dated Sep. 24, 2018.

PCT International Search Report & Written Opinion, RE: Application No. PCT/US2017/068605, dated Jun. 8, 2018.

J. Lainema, et al., "Intra Coding of the HEVC Standard", IEEE Transactions on Circuits and Systems for Video Technology, vol. 22, No. 12, Dec. 1, 2012, pp. 1792-1801.

K. Ugur, et al., "Description of video coding technology proposal by Tandberg, Nokia, Ericsson", 1st JCT-VC Meeting, Dresden, No. JCTV-A119, Apr. 12, 2010.

PCT International Search Report & Written Opinion, RE: Application No. PCT/US2017/068654, dated Mar. 16, 2018.

"Algorithm Description of Joint Exploration Test Model 4 (JEM4)", 116th MPEG Meeting, Chengdu, No. N16511, Nov. 21, 206, pp. 6-12.

K. Panusopone, et al., "Unequal Weight Planar Prediction and Constrained PDPC", 5th JVET Meeting, Geneva, No. JVET-E0068, Jan. 5, 2017.

* cited by examiner $$S[n] = \begin{Bmatrix} 0, 0, 512, 341, 256, 205, 171, 146, 128, 114, 103, 93, 85, 79, 73, 68, \\ 64, 60, 57, 54, 51, 49, 47, 45, 43, 41, 39, 38, 37, 35, 34, 33, \\ 32, 31, 30, 29, 28, 28, 27, 26, 26, 25, 24, 24, 23, 23, 22, 22, \\ 21, 21, 20, 20, 20, 19, 19, 19, 18, 18, 18, 17, 17, 17, 16, 16, \\ 16, 16, 16, 15, 15, 15, 15, 14, 14, 14, 14, 14, 14, 13, 13, 13, \\ 13, 13, 13, 12, 12, 12, 12, 12, 12, 11, 11, 11, 11, 11, 11, 11, \\ 11, 11, 10, 10, 10, 10, 10, 10, 10, 10, 10, 10, 10, 9, 9, 9, \\ 9, 9, 9, 9, 9, 9, 9, 9, 9, 8, 8, 8, 8, 8, 8, 8, \\ 8, 8, 8, 8, 8, 8, 8, 8, 8, 7, 7, 7, 7, 7, 7, 7, \\ 7, 7, 7, 7, 7, 7, 7, 7, 7, 7, 7, 7, 7, 7, 6, 6 \\ 6, 6, 6, 6, 6, 6, 6, 6, 6, 6, 6, 6, 6, 6, 6, 6, \\ 6, 6, 6, 6, 6, 6, 6, 6, 6, 6, 5, 5, 5, 5, 5, 5, \\ 5, 5, 5, 5, 5, 5, 5, 5, 5, 5, 5, 5, 5, 5, 5, 5, \\ 5, 5, 5, 5, 5, 5, 5, 5, 5, 5, 5, 5, 5, 5, 5, 5, \\ 5, 5, 5, 5, 5, 4, 4, 4, 4, 4, 4, 4, 4, 4, 4, 4, \\ 5, 5, 5, 5, 5, 4, 4, 4, 4, 4, 4, 4, 4, 4, 4, 4, \\ 4, 4, 4, 4, 4, 4, 4, 4, 4, 4, 4, 4, 4, 4, 4, 4 \end{Bmatrix}$$

FIG. 10

$$S[n] = \begin{cases} 0, 0, 512, 341, 256, 205, 171, 146, 128, 114, 103, 93, 85, 79, 73, 68, \\ 64, 60, 57, 54, 51, 49, 47, 45, 43, 41, 39, 38, 37, 35, 34, 33, \\ 32, 31, 30, 29, 28, 28, 27, 26, 26, 25, 24, 24, 23, 23, 22, 22, \\ 21, 21, 20, 20, 20, 19, 19, 19, 18, 18, 18, 17, 17, 17, 16, 16, \\ 16, 16, 16, 15, 15, 15, 15, 14, 14, 14, 14, 14, 14, 13, 13, 13, \\ 13, 13, 13, 12, 12, 12, 12, 12, 12, 11, 11, 11, 11, 11, 11, 11, \\ 11, 11, 10, 10, 10, 10, 10, 10, 10, 10, 10, 10, 10, 9, 9, 9, \\ 9, 9, 9, 9, 9, 9, 9, 9, 9, 8, 8, 8, 8, 8, 8, 8, \\ 8, 8, 8, 8, 8, 8, 8, 8, 8, 7, 7, 7, 7, 7, 7, 7, \\ 7, 7, 7, 7, 7, 7, 7, 7, 7, 7, 7, 7, 7, 7, 6, 6, \\ 6, 6, 6, 6, 6, 6, 6, 6, 6, 6, 6, 6, 6, 6, 6, 6, \\ 6, 6, 6, 6, 6, 6, 6, 6, 6, 6, 5, 5, 5, 5, 5, 5, \\ 5, 5, 5, 5, 5, 5, 5, 5, 5, 5, 5, 5, 5, 5, 5, 5, \\ 5, 5, 5, 5, 5, 5, 5, 5, 5, 5, 5, 5, 5, 5, 5, 5, \\ 5, 5, 5, 5, 5, 4, 4, 4, 4, 4, 4, 4, 4, 4, 4, 4, \\ 5, 5, 5, 5, 5, 4, 4, 4, 4, 4, 4, 4, 4, 4, 4, 4, \\ 4, 4, 4, 4, 4, 4, 4, 4, 4, 4, 4, 4, 4, 4, 4, 4, \\ 4, 4, 4, 4, 4, 4, 4, 4, 4, 4, 4, 4, 4, 4, 4, 4, \\ 4, 4, 4, 4, 4, 4, 4, 4, 4, 4, 4, 4, 4, 4, 4, 4, \\ 4, 4, 4, 4, 4, 4, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 3, 3, 3, 3, 3, 3, \\ 3, 3, 3, 3, 3, 3, 3, 3, 3, 3, 2, 2, 2, 2, 2, \\ 2, 2, 2, 2, 2, 2, 2, 2, 2, 2, 2, 2, 2, 2, 2, 2, \\ 2, 2, 2, 2, 2, 2, 2, 2, 2, 2, 2, 2, 2, 2, 2, 2, \\ 2, 2, 2, 2, 2, 2, 2, 2, 2, 2, 2, 2, 2, 2, 2, 2, \\ 2, 2, 2, 2, 2, 2, 2, 2, 2, 2, 2, 2, 2, 2, 2, 2, \\ 2, 2, 2, 2, 2, 2, 2, 2, 2, 2, 2, 2, 2, 2, 2, 2, \\ 2, 2, 2, 2, 2, 2, 2, 2, 2, 2, 2, 2, 2, 2, 2, 2 \end{cases}$$

*FIG. 11*

$$S[n] = \begin{Bmatrix} 341, 256, 205, 171, 146, 128, 114, 102, 93, 85, 79, 73, 68, \\ 64, 60, 57, 54, 51, 49, 47, 45, 43, 41, 39, 38, 37, 35, 34, 33, \\ 32, 31, 30, 29, 28, 28, 27, 26, 26, 25, 24, 24, 23, 23, 22, 22, \\ 21, 21, 20, 20, 20, 19, 19, 19, 18, 18, 18, 17, 17, 17, 17, 16, \\ 16, 16, 16, 15, 15, 15, 15, 14, 14, 14, 14, 14, 13, 13, 13, 13, \\ 13, 13, 12, 12, 12, 12, 12, 12, 12, 12, 11, 11, 11, 11, 11, 11, \\ 11, 11, 10, 10, 10, 10, 10, 10, 10, 10, 10, 10, 9, 9, 9, 9, \\ 9, 9, 9, 9, 9, 9, 9, 9, 9, 8, 8, 8, 8, 8, 8, 8, 8 \end{Bmatrix}$$

FIG. 12

$$S[n] = \left\{ \begin{array}{c} 171, 128, 102, 85, 73, 64, 57, 51, 47, 43, 39, 37, 34, \\ 30, 28, 27, 26, 24, 23, 22, 21, 20, 20, 19, 18, 18, 17, 17 \\ 16, 16, 15, 15, 14, 14, 13, 13, 13, 12, 12, 12, 12, 11, 11, 11 \\ 11, 10, 10, 10, 10, 10, 9, 9, 9, 9, 9, 9, 9, 8, 8, 8, \\ 8, 8, 8, 8, 8, 7, 7, 7, 7, 7, 7, 7, 7, 7, 7, 6, \\ 6, 6, 6, 6, 6, 6, 6, 6, 6, 6, 6, 6, 6, 6, 5, 5, \\ 5, 5, 5, 5, 5, 5, 5, 5, 5, 5, 5, 5, 5, 5, 5, 5, \\ 5, 5, 4, 4, 4, 4, 4, 4, 4, 4, 4, 4, 4, 4, 4, 4, 4 \end{array} \right\}$$

FIG. 13

UNEQUAL WEIGHT PLANAR PREDICTION

CLAIM OF PRIORITY

This Application claims priority under 35 U.S.C. § 119(e) from earlier filed U.S. Provisional Application Ser. No. 62/439,724, filed Dec. 28, 2016, from earlier filed U.S. Provisional Application Ser. No. 62/440,379, filed Dec. 29, 2016, from earlier filed U.S. Provisional Application Ser. No. 62/459,797, filed Feb. 16, 2017, from earlier filed U.S. Provisional Application Ser. No. 62/522,420, filed Jun. 20, 2017, and from earlier filed U.S. Provisional Application Ser. No. 62/482,178, filed Apr. 5, 2017 each of which is hereby incorporated by reference.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

The present disclosure provides a method for calculating a final planar prediction in planar mode to predict pixel values for a current coding block having height H, width W, and a top-left (TL) pixel within the current coding block is defined by coordinates x=0 and y=0. The method comprises interpolating a horizontal predictor and a vertical predictor for a pixel in a current coding block received in a vide bitstream. A final planar prediction value P(x,y) may be calculated using unequal weights applied to each of the first and second predictors. The final planar prediction value may be determined in accordance with $P(x,y)=(A(x,y)*P_h(x,y)+B(x,y)*P_v(x,y)+c(x,y))/(D(x,y))$, where $A(x,y)$ and $B(x,y)$ are position dependent weighting factors for the horizontal and vertical predictors, respectively, $c(x,y)$ is a position dependent rounding factor, and $D(x,y)$ is a position dependent scaling factor.

The present disclosure also provides an apparatus for calculating a final planar prediction by way of the techniques disclosed herein.

BRIEF DESCRIPTION OF THE DRAWINGS

Further details of the present invention are explained with the help of the attached drawings in which:

FIG. 10 is an example of S[n], where sum of width and height is 256 and shiftDenom=10.

FIG. 11 illustrates another example of S[n], where the sum of the width and height is 512 and shiftDenom=10.

FIG. 12 illustrates another example of S[n], where sum of width and height is 128 and shiftDenom=10.

FIG. 13 illustrates another example of S[n], where width and height is 128 and shiftDenom=9.

DETAILED DESCRIPTION

Digital video involves a large amount of data representing each and every frame of a digital video sequence, or series of frames, in an uncompressed manner. Transmitting uncompressed digital video across computer networks is usually limited by bandwidth limitations, and usually requires a large amount of storage space. Encoding the digital video may reduce both storage and bandwidth requirements.

Frames of a video sequence, or more specifically the coding tree units within each frame, can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme.

Figure 1:
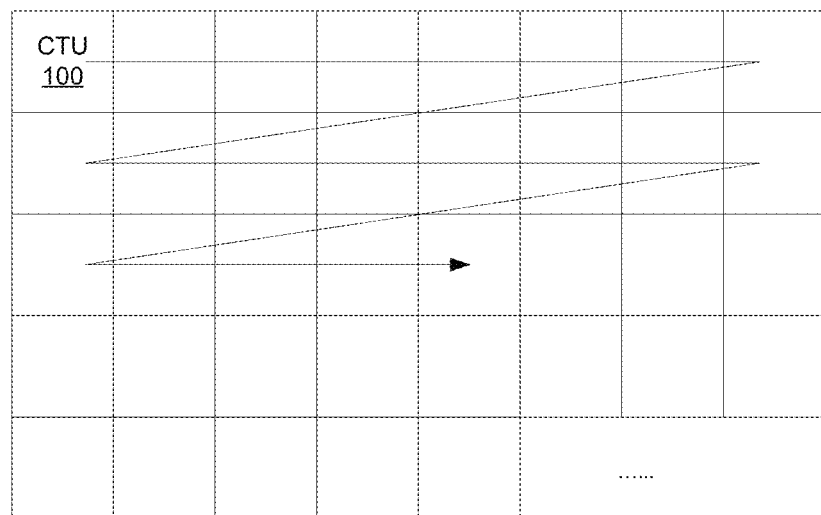
FIG. 1 depicts division of a frame into a plurality of Coding Tree Units (CTUs).

During coding with JVET, a frame is first divided into square blocks called Coding Tree Units (CTUs) 100, as shown in FIG. 1. FIG. 1 depicts division of a frame into a plurality of CTUs 100. For example, CTUs 100 can be blocks of 128×128 pixels. A frame can be an image in a video sequence, which may include a plurality of frames. A frame can include a matrix, or set of matrices, with pixel values representing intensity measures in the image. The pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Figure 2:
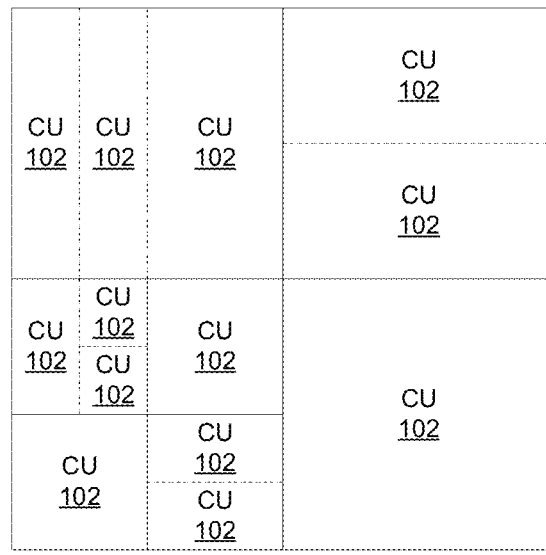
FIG. 2 depicts an exemplary partitioning of a CTU into Coding Units (CUs).

FIG. 2 depicts an exemplary partitioning of a CTU 100 into CUs 102, which are the basic units of prediction in coding. Each CTU 100 in a frame can be partitioned into one or more CUs (Coding Units) 102. CUs 102 can be used for prediction and transform as described below. Unlike HEVC, in JVET the CUs 102 can be rectangular or square, and can be coded without further partitioning into prediction units or transform units. The CUs 102 can be as large as their root CTUs 100, or be smaller subdivisions of a root CTU 100 as small as 4×4 blocks.

In JVET, a CTU 100 can be partitioned into CUs 102 according to a quadtree plus binary tree (QTBT) scheme in which the CTU 100 can be recursively split into square blocks according to a quadtree, and those square blocks can then be recursively split horizontally or vertically according to binary trees. Parameters can be set to control splitting according to the QTBT, such as the CTU size, the minimum sizes for the quadtree and binary tree leaf nodes, the maximum size for the binary tree root node, and the maximum depth for the binary trees.

By way of a non-limiting example, FIG. 2 shows a CTU 100 partitioned into CUs 102, with solid lines indicating quadtree splitting and dashed lines indicating binary tree splitting. As illustrated, the binary splitting allows horizontal splitting and vertical splitting to define the structure of the CTU and its subdivision in to CUs.

Figure 3:
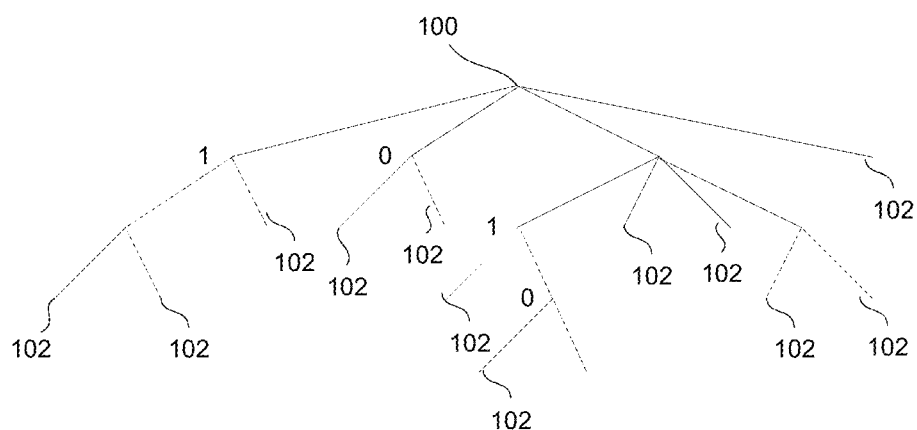
FIG. 3 depicts a quadtree plus binary tree (QTBT) representation of FIG. 2's CU partitioning.

FIG. 3 shows a QTBT block structure representation of FIG. 2's partitioning. To generate an encoded representation of a picture or image, the video encoder may generate a set of CTUs. in FIG. 3, quadtree root node represents the CTU 100. To generate a coded CTU, the video encoder may recursively perform quadtree partitioning on the coding tree blocks of a CTU to divide the coding tree blocks into coding blocks (CB)s. Thus, as used herein, a video slice (e.g., a video frame or a portion of a video frame) may be partitioned into coding blocks, which may also be referred to as coding units, and each such coding unit may include blocks, such as luma blocks and chroma blocks, that are independently decoded. Thus, because JEM supports flexibility for CU partition shapes to better match local characteristics of video data, CUs may have non-square shapes and coding may take place at the CU level or at the luma or chroma block level within the CU. Reference is made herein to encoding or decoding a coding block, where a coding block represents a block of pixels that makes up a CU or coding blocks within the CU.

As shown in FIG. 3, each child node in a CTU 100 in the quadtree portion represents one of four square blocks split from a parent square block. The square blocks represented by the quadtree leaf nodes can then be divided zero or more times using binary trees, with the quadtree leaf nodes being root nodes of the binary trees, representing the parent coding unit that is partitioned into two child coding units. At each level of the binary tree portion, a block can be divided vertically or horizontally and symmetrically or asymmetrically. For example, a flag set to "0" may indicate that the block is symmetrically split horizontally, while a flag set to "1" may indicate that the block is symmetrically split vertically.

After quadtree splitting and binary tree splitting, the blocks represented by the QTBT's leaf nodes represent the final CUs 102 to be coded, such as coding using inter prediction or intra prediction. Inter-prediction exploits temporal redundancies between different frames. For example, temporally adjacent frames of video may include blocks of pixels that remain substantially the same. During encoding, a motion vector may interrelate movement of blocks of pixels in one frame to a block of correlating pixels in another frame. Thus, the system need not encode the block of pixels twice, but rather encode the block of pixels once and provide the motion vector to predict the correlated block of pixels.

For intra-prediction, a frame or portion of a frame may be encoded without reference to pixels in other frames. Instead, intra-prediction may exploit the spatial redundancies among blocks of pixels within a frame. For example, where spatially adjacent blocks of pixels have similar attributes, the coding process may reference a spatial correlation between adjacent blocks, exploiting the correlation by prediction of a target block based on prediction modes used in adjacent blocks.

For inter slices or slices or full frames coded with inter prediction, different partitioning structures can be used for luma and chroma components. For example, for an inter slice a CU 102 can have coding blocks for different color components, such as such as one luma CB and two chroma CBs. For intra slices or slices or full frames coded with intra prediction, the partitioning structure can be the same for luma and chroma components. Thus, each of the CTUs 100 may comprise a coding tree block of luma samples, corresponding coding tree blocks of chroma samples, and syntax structures used to code the samples of the coding tree blocks. A CTU may comprise a single coding tree block and the syntax structures used to code the samples. In either case, the CTU with coding blocks may be comprised within one or more coding units, as shown by FIG. 2 and FIG. 3.

Figure 4:
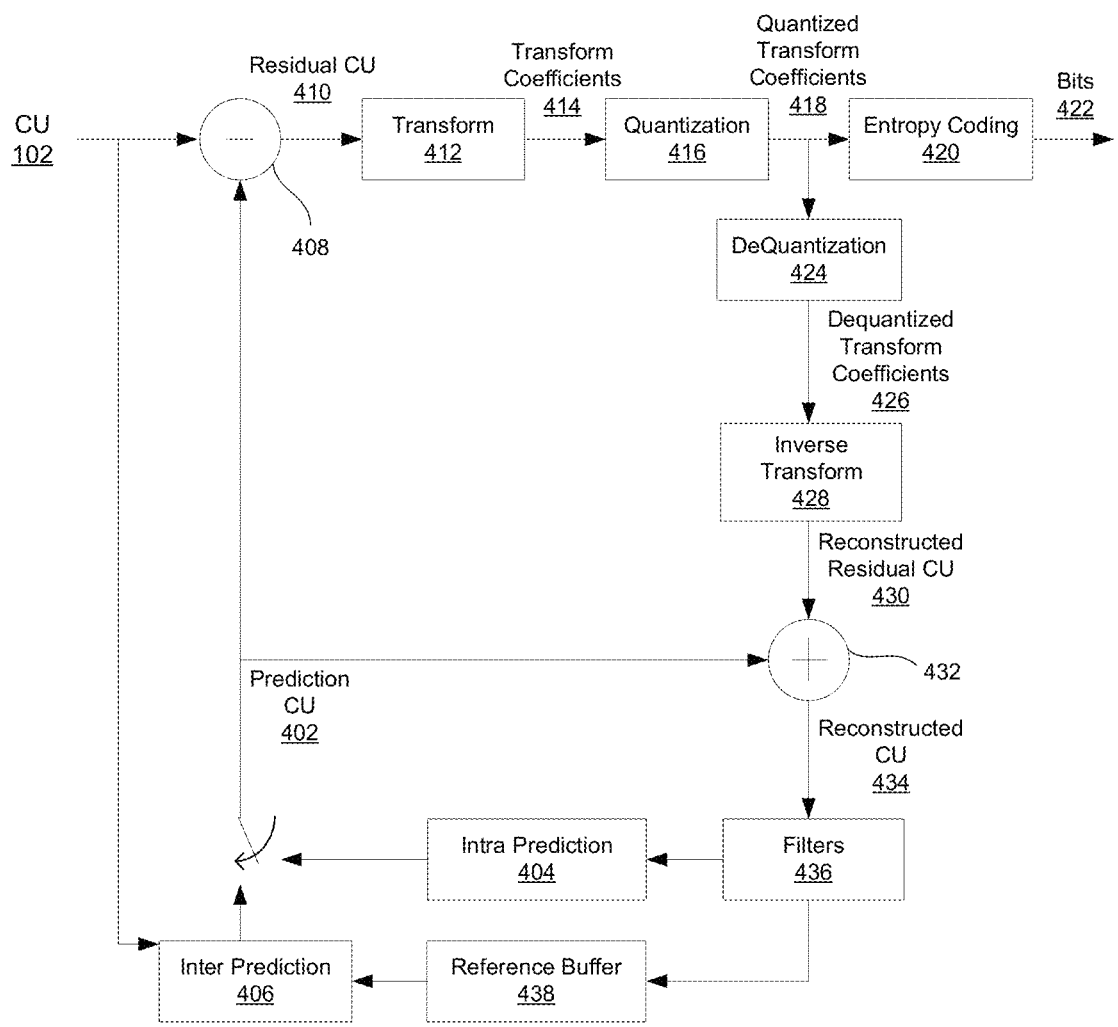
FIG. 4 depicts a simplified block diagram for CU coding in a JVET encoder.

FIG. 4 depicts a simplified block diagram for CU coding in a JVET encoder. The main stages of video coding include partitioning to identify CUs 102 as described above, followed by encoding CUs 102 using prediction at 404 or 406, generation of a residual CU 410 at 408, transformation at 412, quantization at 416, and entropy coding at 420. The encoder and encoding process illustrated in FIG. 4 also includes a decoding process that is described in more detail below.

Given a current CU 102 (e.g., a CU prior to encoding; e.g., the original CU to be encoded for transmission in the bitstream by generating a prediction CU) the encoder can obtain a prediction CU 402 either spatially using intra prediction at 404 or temporally using inter prediction at 406. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A sequence of coding units may make up a slice, and one or more slices may make up a picture. A slice may include one or more slice segments, each in its own NAL unit. A slice or slice segment may include header information for the slice or bitstream.

A slice, such as an entire picture or a portion of a picture, coded entirely with intra-predicted CUs can be an I slice that can be decoded without reference to other slices, and as such can be a possible point where decoding can begin. A slice coded with at least some inter-predicted CUs can be a predictive (P) or bi-predictive (B) slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases, P slices and B slices can also or alternately be encoded using intra block copy, in which data from other portions of the same slice is used.

As will be discussed below, the intra prediction or inter prediction can be performed based on reconstructed CUs 434 from previously coded CUs 102, such as neighboring CUs 102 or CUs 102 in reference pictures.

When a CU 102 is coded spatially with intra prediction at 404, an intra prediction mode can be found that best predicts pixel values of the CU 102 based on samples from neighboring CUs 102 in the picture.

When coding a CU's luma or chroma block components, the encoder can generate a list of candidate intra prediction modes. While HEVC had 35 possible intra prediction modes for luma components, in JVET there are 67 possible intra prediction modes for luma components. These include a planar mode that uses a three-dimensional plane of values generated from neighboring pixels, a DC mode that uses values averaged from neighboring pixels, and the 65 directional modes shown in FIG. 5 that use values copied from neighboring pixels along the indicated directions.

When generating a list of candidate intra prediction modes for a CU's luma block component, the number of candidate modes on the list can depend on the CU's size. The candidate list can include: a subset of HEVC's 35 modes with the lowest SATD (Sum of Absolute Transform Difference) costs; new directional modes added for JVET that neighbor the candidates found from the HEVC modes; and modes from a set of six most probable modes (MPMs) for the CU 102 that are identified based on intra prediction modes used for previously coded neighboring blocks as well as a list of default modes.

When coding a CU's chroma block components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 402 can be smoothed further with a position dependent intra prediction combination (PDPC) process that adjusts a prediction CU 402 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 406, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at $\frac{1}{16}$ pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations, local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 402 using those motion vectors. In some cases, when motion vectors have been found for individual sub-CUs, Overlapped Block Motion Compensation (OBMC) can be used when generating a prediction CU 402 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 402 generated with each of the two motion vectors can be found, and the two motion vectors can be refined by replacing them with new motion vectors that best point to the combined prediction CU 402. The two refined motion vectors can be used to generate the final prediction CU 402.

At 408, once a prediction CU 402 has been found with intra prediction at 404 or inter prediction at 406 as described above, the encoder can subtract the prediction CU 402 from the current CU 102 find a residual CU 410.

The encoder can use one or more transform operations at 412 to convert the residual CU 410 into transform coefficients 414 that express the residual CU 410 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases, a mode dependent non-separable secondary transform (MDNSST) can be applied to low frequency transform coefficients 414 after a forward core transform. The MDNSST operation can use a Hypercube-Givens Transform (HyGT) based on rotation data. When used, an index value identifying a particular MDNSST operation can be signaled by the encoder.

At 416, the encoder can quantize the transform coefficients 414 into quantized transform coefficients 416. The quantization of each coefficient may be computed by dividing a value of the coefficient by a quantization step, which is derived from a quantization parameter (QP). In some embodiments, the Qstep is defined as $2(QP-4)/6$. Because high precision transform coefficients 414 can be converted into quantized transform coefficients 416 with a finite number of possible values, quantization can assist with data compression. Thus, quantization of the transform coefficients may limit a number of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET may utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 420, the encoder can find final compression bits 422 by entropy coding the quantized transform coefficients 418. Entropy coding aims to remove statistical redundancies of the information to be transmitted. In JVET, CABAC (Context Adaptive Binary Arithmetic Coding) can be used to code the quantized transform coefficients 418, which uses probability measures to remove the statistical redundancies. For CUs 102 with non-zero quantized transform coefficients 418, the quantized transform coefficients 418 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin1, and bin2), an index value that indicates which context model to use for the bin can be found by finding the sum of that bin position in up to five previously coded neighboring quantized transform coefficients 418 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 422 of residual CUs 410, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below. In some embodiments, the encoder can save overhead in the bitstream by omitting information from the bitstream that indicates which intra prediction modes were used to encode CUs 102, and the decoder can use template matching when decoding CUs 102 encoded with intra prediction.

In addition to using the quantized transform coefficients 418 to find the final compression bits 422, the encoder can also use the quantized transform coefficients 418 to generate reconstructed CUs 434 by following the same decoding process that a decoder would use to generate reconstructed CUs 434. Thus, once the transformation coefficients have been computed and quantized by the encoder, the quantized transform coefficients 418 may be transmitted to the decoding loop in the encoder. After quantization of a CU's transform coefficients, a decoding loop allows the encoder to generate a reconstructed CU 434 identical to the one the decoder generates in the decoding process. Accordingly, the encoder can use the same reconstructed CUs 434 that a decoder would use for neighboring CUs 102 or reference pictures when performing intra prediction or inter prediction for a new CU 102. Reconstructed CUs 102, reconstructed slices, or full reconstructed images or frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 426. For example, in the decoding process shown in FIG. 4 in the encoder, the quantized transform coefficients 418 of a residual CU 410 can be dequantized at 424 to find dequantized transform coefficients 426. If an MDNSST operation was performed during encoding, that operation can be reversed after dequantization.

At 428, the dequantized transform coefficients 426 can be inverse transformed to find a reconstructed residual CU 430, such as by applying a DCT to the values to obtain the reconstructed image. At 432 the reconstructed residual CU 430 can be added to a corresponding prediction CU 402 found with intra prediction at 404 or inter prediction at 406, in order to find a reconstructed CU 434. While in some embodiments the encoder can perform intra prediction at 404 as described above, in other embodiments the encoder can perform intra prediction template matching to generate a prediction CU 402 in the same way that a decoder would use template matching for intra prediction if information identifying the intra prediction mode used for the CU 102 is omitted from the bitstream.

At 436, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 438 for inter prediction of future CUs 102 at 406.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 6:
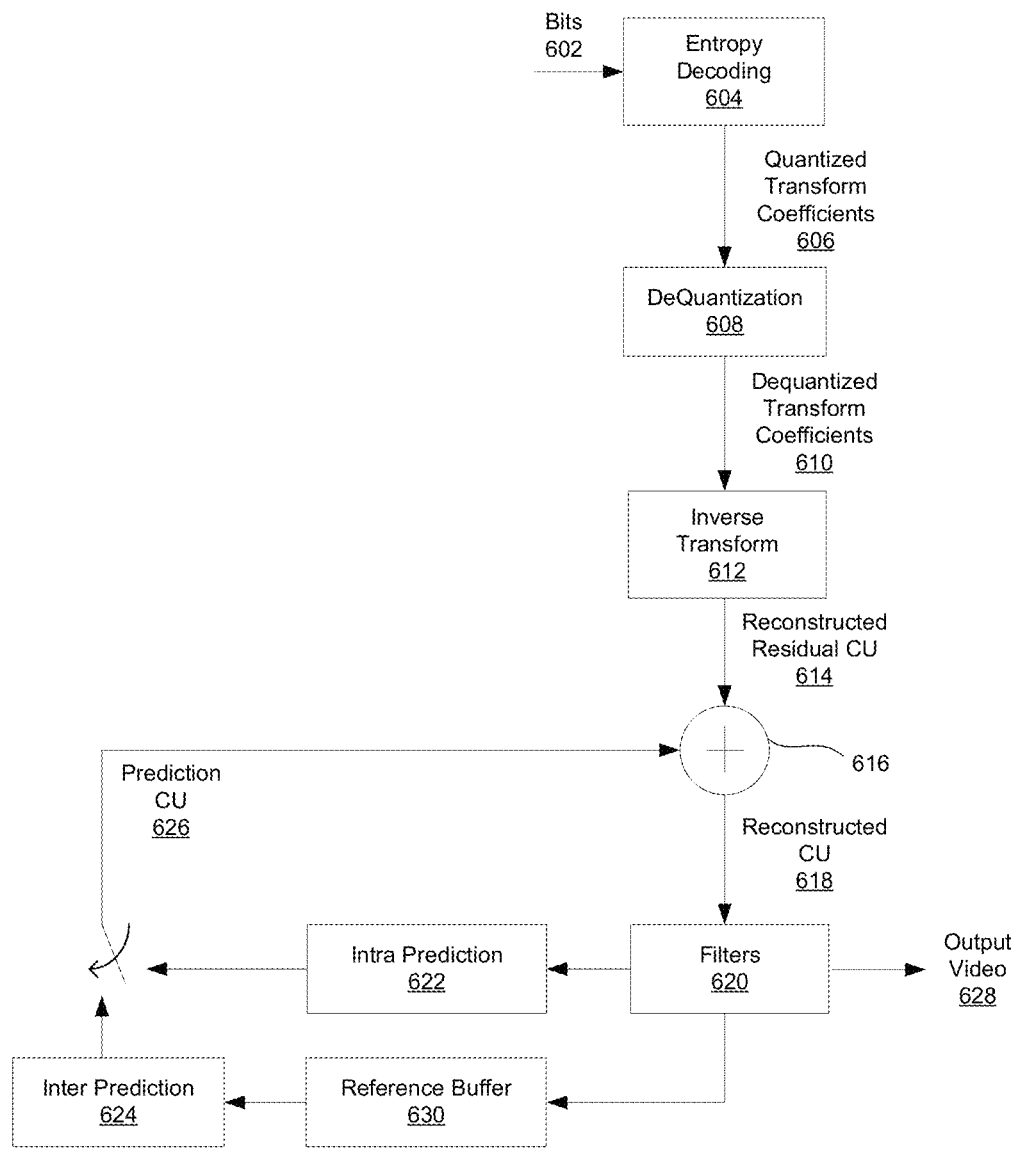
FIG. 6 depicts a simplified block diagram for CU coding in a JVET decoder.

FIG. 6 depicts a simplified block diagram for CU coding in a JVET decoder. A JVET decoder can receive a bitstream, or bits, 602 containing information about encoded video data. The encoded video data may represent partitioned luma blocks and partitioned chroma blocks, where the chroma blocks may be partitioned and coded independently of the luma blocks. The decoder may determine the respective coding mode respective to the blocks within each CU 102.

The bitstream can indicate how CUs 102 of a picture were partitioned from a CTU 100 according to a QTBT structure. The decoder may determine the tree structure as part of obtaining syntax elements from the bitstream. The tree structure may specify how the initial video block, such as a CTB, is partitioned into smaller video blocks, such as coding units.

As described herein, for each respective non-leaf node of the tree structure at each depth level of the tree structure, there are various splitting patterns for the respective non-leave node. By way of a non-limiting example, the bitstream can signal how CUs 102 were partitioned from each CTU 100 in a QTBT using quadtree partitioning, symmetric binary partitioning, and/or asymmetric binary partitioning. The video block corresponding to such respective non-leaf node may be partitioned into video blocks corresponding to the child nodes of the respective non-leaf node.

The bitstream can also indicate prediction information for the CUs 102 such as intra prediction modes or motion vectors. Bits 602 represent entropy encoded residual CUs. In some embodiments, syntax can be coded in the bitstream that indicates the intra prediction modes used to code each CU 102. In some embodiments, the encoder can have omitted information in the bitstream about intra prediction modes used to encode some or all CUs 102 coded using intra prediction, and as such the decoder can use template matching for intra prediction At 604 the decoder can decode the entropy encoded bits 602 using the CABAC context models signaled in the bitstream by the encoder. The decoder can use parameters signaled by the encoder to update the context models' probabilities in the same way they were updated during encoding.

After reversing the entropy encoding at 604 to find quantized transform coefficients 606, the decoder can dequantize them at 608 to find dequantized transform coefficients 610. If an MDNSST operation was performed during encoding, that operation can be reversed by the decoder after dequantization.

At 612, the dequantized transform coefficients 610 can be inverse transformed to find a reconstructed residual CU 614. At 616, the reconstructed residual CU 614 can be added to a corresponding prediction CU 626 found with intra prediction at 622 or inter prediction at 624, in order to find a reconstructed CU 618. In some embodiments, the decoder can find the prediction CU 626 using template matching for intra prediction.

At 620, one or more filters can be applied to the reconstructed data, at a picture level or CU level, for example. For example, the decoder can apply a deblocking filter, a sample adaptive offset (SAO) filter, and/or an adaptive loop filter (ALF). As described above, the in-loop filters located in the decoding loop of the encoder may be used to estimate optimal filter parameters to increase the objective and subjective quality of a frame. These parameters are transmitted to the decoder to filter the reconstructed frame at 620 to match the filtered reconstructed frame in the encoder.

After reconstructed pictures have been generated by finding reconstructed CUs 618 and applying signaled filters, the decoder can output the reconstructed pictures as output video 628. If reconstructed pictures are to be used as reference pictures, they can be stored in a reference buffer 630 for inter prediction of future CUs 102 at 624.

In some embodiments, the bitstream received by a JVET decoder can include syntax identifying which intra prediction mode was used to encode a CU 102 with intra prediction, such that the decoder can directly use the signaled intra prediction mode at 622 to generate a prediction CU 626. In some embodiments, such syntax can be omitted to save overhead by reducing the number of bits in the bitstream. In these embodiments, when the decoder is not provided with an indication of which intra prediction mode was used to encode a CU 102, the decoder can use template matching for intra prediction at 622 to derive the intra prediction mode it should use to generate a prediction CU 626. In some embodiments, an encoder can similarly use template matching for intra prediction at 404 when generating a prediction CU 402 to combine with a reconstructed residual CU 430 at 432 within its decoding loop.

Figure 5:
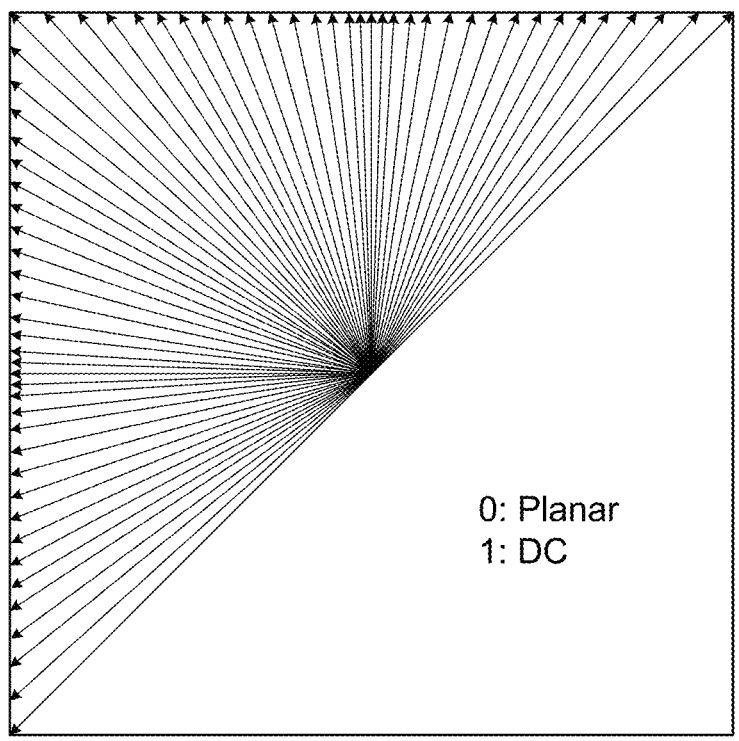
FIG. 5 depicts possible intra prediction modes for luma components in JVET.

As described herein, intra coding is a main tool for video compression. It utilizes the spatial neighbors of a pixel to create a predictor, from which a prediction residual between the pixel and its predictor is determined. Video encoder then compresses the residuals, resulting in the coding bitstream. The developing video coding standard, JVET, allows 67 possible intra prediction modes, including planar mode, DC mode, and 65 angular direction modes, as shown in FIG. 5. Each intra prediction mode has unique prediction generation method, based on either left-side neighbor or top-side neighbor. Each intra coding unit (CU) selects at least one intra prediction mode to be used, which needs to be signaled as overhead in bitstream. For example, where a single CU includes one luma coding block and two chroma coding blocks, each of the luma coding block and chroma coding block can have their own intra prediction mode. Thus, if signaled in the bitstream, multiple intra prediction modes may be identified.

Disclosed herein are various techniques to implement an unequal weight planar prediction mode (UW-Planar). In embodiments, the prediction mode approximates a predictor and prediction residuals that generates predicted pixels that are closer to the actual pixels, resulting in improved coding efficiency.

Figure 7A:
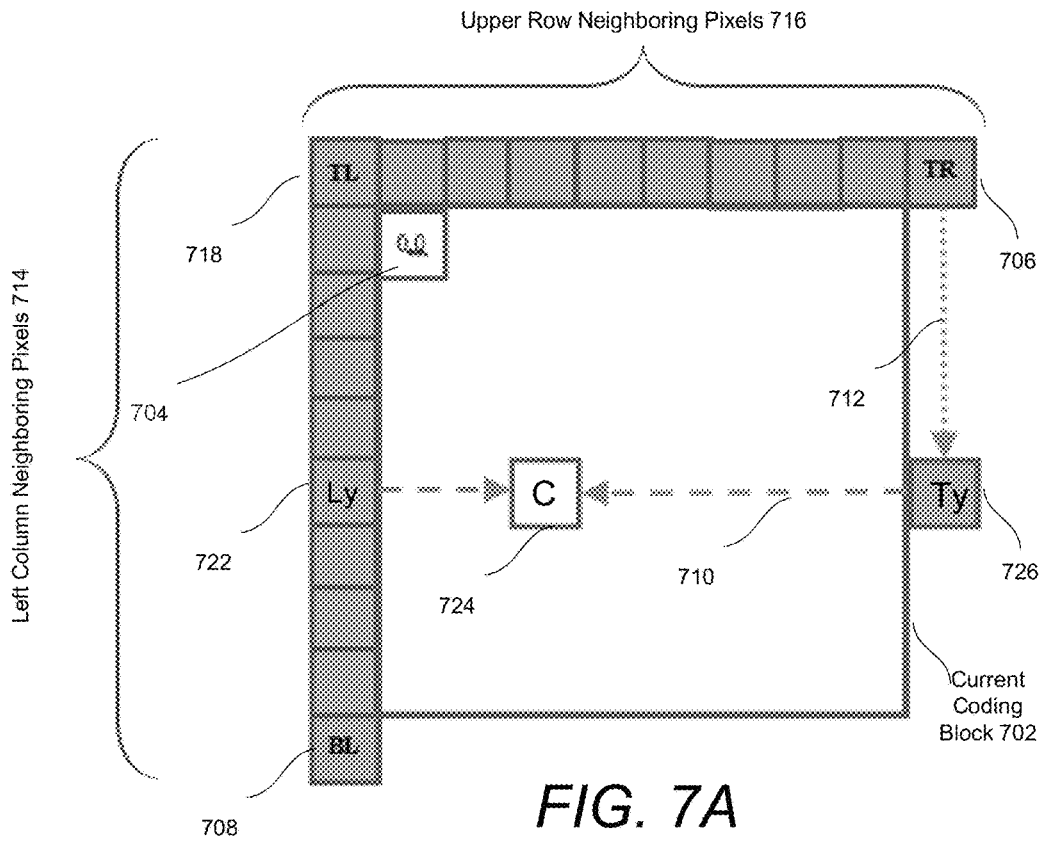
FIG. 7A depicts the horizontal predictor calculation.
Figure 7B:
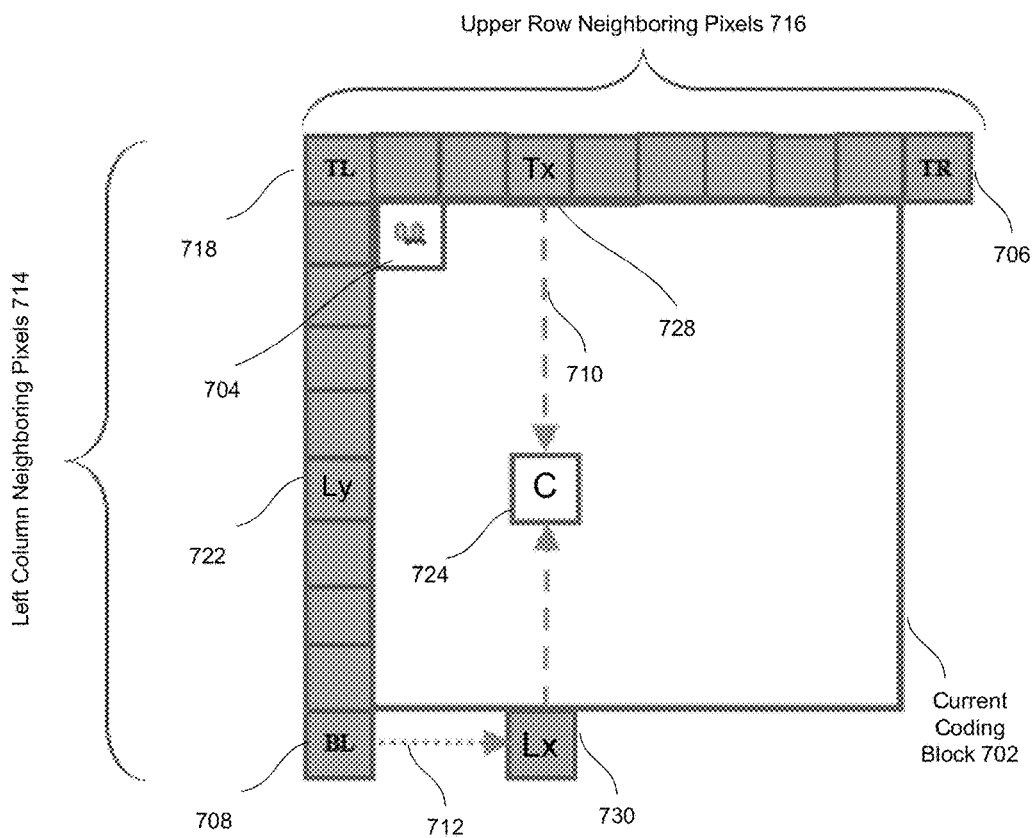
FIG. 7B depicts a vertical predictor calculation.

Planar mode is often the most frequently used intra coding mode in HEVC and JVET. Planar mode is often suited for blocks with a smooth image whose pixel values gradually change with a small planar gradient. FIGS. 7A and 7B show the HEVC and JVET planar predictor generation process for a coding unit (block) 702 with height H=8 and width W=8, where the (0,0) coordinates corresponds to the top-left (TL) position 704 within the coding CU, where TL position 718 is a top left neighboring corner pixel. TR 706 denotes top right position and BL 708 denotes bottom left position. The dashed line 710 indicates interpolation and the dotted line 712 indicates replication. FIG. 7A depicts the horizontal predictor calculation and FIG. 7B depicts a vertical predictor calculation.

Planar mode in HEVC and JVET (HEVC Planar) generates a first order approximation of the prediction for a current coding unit (CU) by forming a plane based on the intensity values of the neighboring pixels. Due to a raster-scan coding order, the reconstructed left column neighboring pixels 714 and the reconstructed top row neighboring pixels 716 are available for a current coding block 702, but not the right column neighboring pixels and the bottom row neighboring pixels. The planar predictor generation process sets the intensity values of all the right column neighboring pixels to be the same as the intensity value of the top right neighboring pixel 706, and the intensity values of all the bottom row pixels to be the same as the intensity value of the bottom left neighboring pixel 708.

Once the neighboring pixels surrounding a current coding block are defined, the horizontal and the vertical predictors ($P_h(x,y)$ and $P_v(x,y)$, respectively) for each pixel within the current coding block 702 are determined according to equations (1) and (2) below.

$$P_h(x,y)=(W-1-x)*R(-1,y)+(x+1)*R(W-1) \quad (1)$$

$$P_v(x,y)=(H-1-y)*R(x,-1)+(y+1)*R(-1,H) \quad (2)$$

Where:
$R(x,y)$ denotes the intensity value of the reconstructed neighboring pixel at (x,y) coordinate,
W is block width, and
H is block height.

As depicted in FIG. 7A, a horizontal predictor is interpolated from referencing reconstructed reference sample Ly 722, a pixel in the left column neighboring pixels 714, that is at the same y-coordinate as the current sample C 724, and referencing sample Ty 726 which is a copy of previously reconstructed sample TR 718 that is adjacent to the top-right pixel of the coding unit. Thus, the horizontal predictor is calculated using linear interpolation between a value of a respective horizontal boundary pixel and a value of a vertical boundary pixel.

As depicted in FIG. 7B, a vertical predictor is interpolated from reconstructed sample Tx 728 from the top row neighboring pixels at the same x-coordinate as the current prediction pixel C and referencing sample Lx 730 which is a copy of the previously reconstructed sample BL 708, a neighboring left pixel that is adjacent to the bottom left sample of the coding unit. Thus, the vertical predictor is calculated using liner interpolation between a value of a respective vertical boundary pixel and a value of a horizontal boundary value.

Once the horizontal and vertical predictor is determined for a coding unit pixel, the final predictor can be determined. For each pixel in a coding block, the final planar predictor, $P(x,y)$, is the intensity value that may be computed by averaging the horizontal and vertical predictors according to equation (3), with certain adjustments in embodiments in which the current CU or coding block is non-square.

$$P(x,y)=(H*P_h(x,y)+W*P_v(x,y))/(2*H*W) \quad (3)$$

The encoder may also signal a residual between the prediction coding unit and the current coding unit in the bitstream to the decoder.

Figure 8:
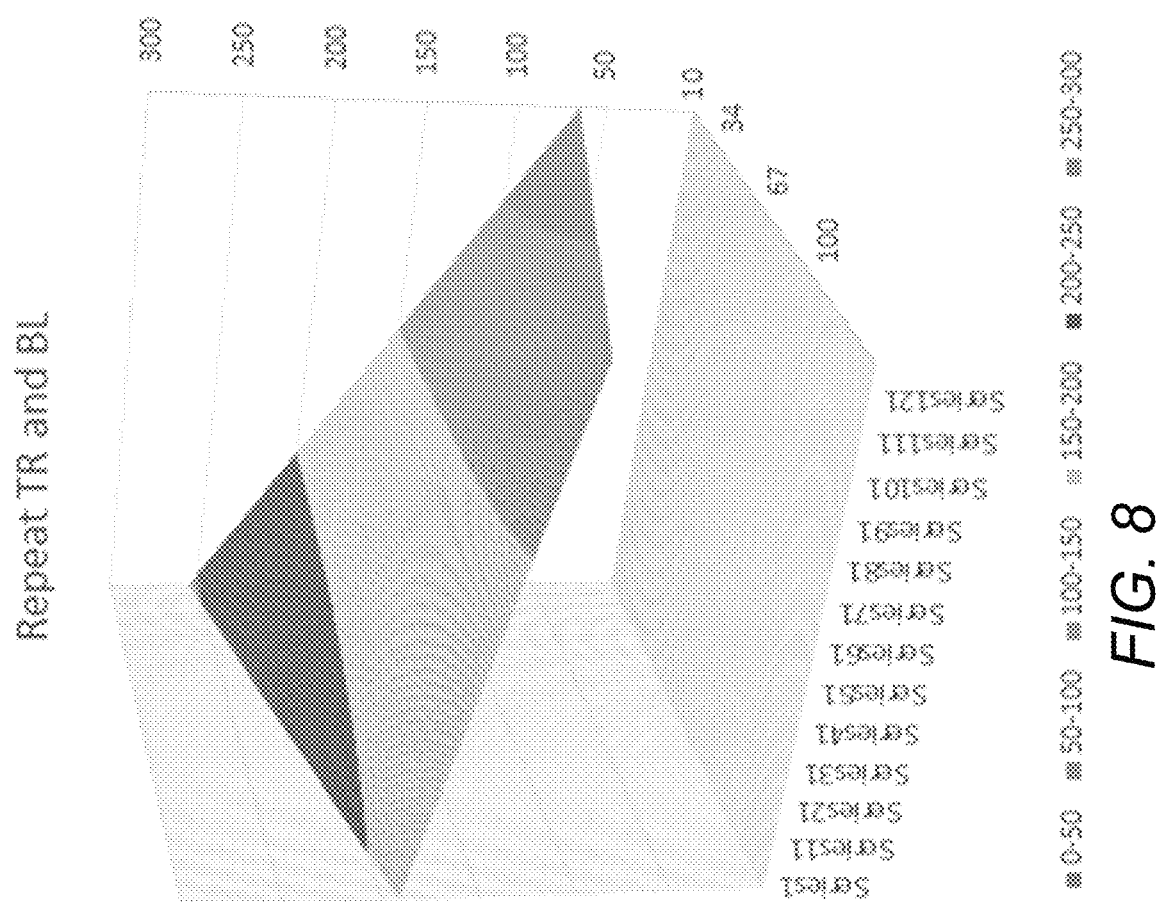
FIG. 8 depicts an example of planar prediction plane with the JVET method that deviates from the flat plane.

Certain constraints with the current planar mode in JVET may cause coding inefficiencies. For example, as described above, all the right column neighboring pixels are set to the same intensity value, which is the value of the top right neighboring pixel. Similarly, all the bottom row neighboring pixels are set to the same intensity value, which is the value of the bottom left neighboring pixel. Setting all right column pixels the same, and all bottom row pixels the same, conflicts with plane prediction assumption. Thus, these constraints cause the planar prediction block to deviate from an ideal flat plane. FIG. 8 depicts an example of planar prediction plane with the JVET method that deviates from the flat plane (TR denotes top right position and BL denotes bottom left position).

Another constraint of the current JVET planar mode comes from the final predictor computation of equation (3), where equal weights are assigned to both the horizontal and the vertical predictors. Equal weight assignment may be suboptimal, given the current planar generation process setup. Specifically, the top row and the left column neighboring pixels are the reconstructed pixels, and they are more accurate compared to the corresponding original or actual top row and left column pixels than the derived bottom row and right column neighboring pixels are to the original or actual bottom row and right column pixels, respectively. The bottom row and right column neighboring pixels are non-causal and their intensity values are estimated. Thus, depending on a pixel position within a CU, the horizontal and/or vertical predictor accuracy varies based on the proximity to a more reliable neighboring pixel used in the calculation of the predictor.

Disclosed herein are embodiments for deriving an intensity value of a bottom right neighboring pixel P(W,H) for a current coding block. In embodiments, a coding unit may be the smallest coding block(s) within a CTU that is coded. In embodiments, a coding unit may include luma and chroma coding blocks that are independently coded. The proposed techniques include computing an intensity value of the bottom right neighboring pixel (lifting), and then computing the intensity values of the bottom row and the right column neighboring pixels, using the derived intensity value of the bottom right neighboring pixel along with the intensity values of other corner neighboring pixels, such as the top right neighboring pixel and the bottom left neighboring pixel. It is noted that a corner pixel at coordinates x=0, y=0 within the coding block is different from the corner neighboring pixels (e.g., P(W,H)) which is outside the coding block.

An example of a lifting process is a weighted average of the top right and the bottom left neighboring pixels, as defined in equation (4).

$$P(W,H)=(W*R(W,-1)+H*R(-1,H))/(H+W) \quad (4)$$

Another example of lifting process is maintaining a flat plane based on the intensity value of the top left, the top right, and the bottom left neighboring pixels, as defined in equation (5).

$$P(W,H)=R(W,-1)+R(-1,H)-R(-1,-1) \quad (5)$$

Figure 9:
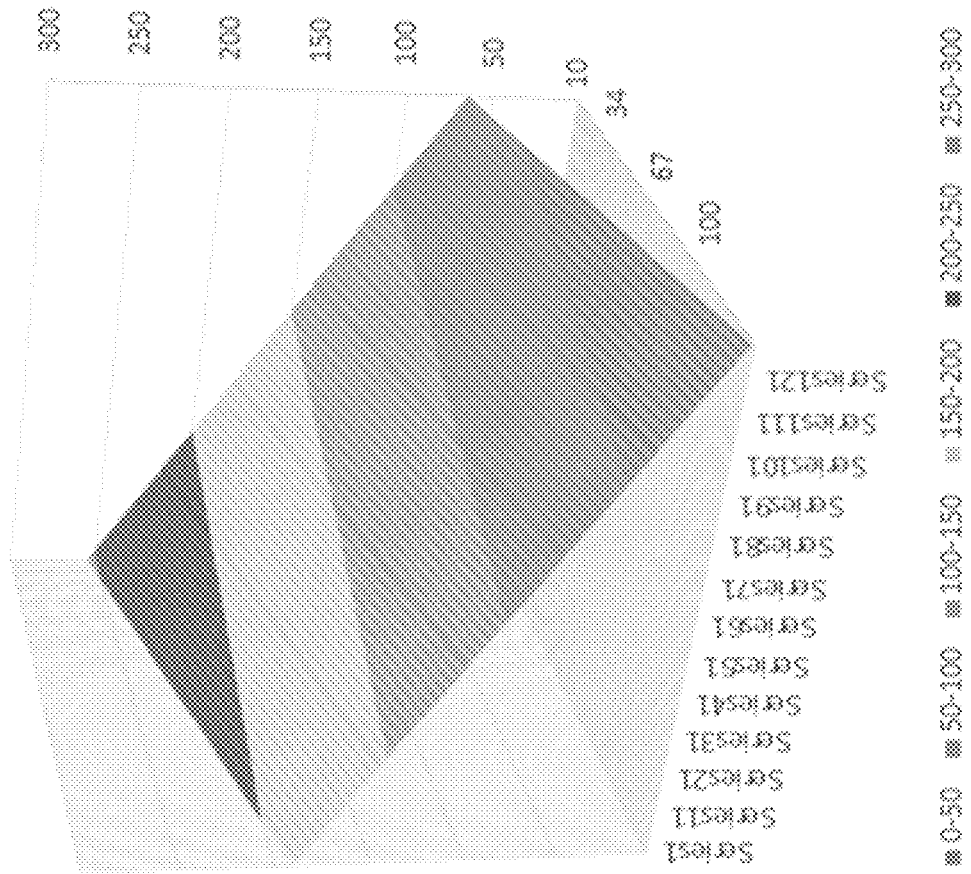
FIG. 9 illustrates the planar prediction block generated based on equation (5), with the corner intensity values identical to an example in FIG. 8.

FIG. 9 illustrates the planar prediction block generated based on equation (5), with the corner intensity values identical to an example in FIG. 8. As shown, a flat planar prediction plane results from using equation (5) given the same three corner points as in FIG. 8 (TR denotes top-right position, TL denotes top-left position and BL denotes bottom-left position).

With the derived intensity value of the bottom right neighboring pixel of P (W, H), the intensity values of the bottom row neighboring pixels, $P_b$ (x,H), and the right column neighboring pixels, $P_r$(W,y), can be computed accordingly. One example of such computation follows linear interpolation according to equations (6) and (7).

$$P_b(x, H) = \frac{(W-1-x)*R(-1, H) + (x+1)*P(W, H)}{W} \quad (6)$$

$$P_r(W, y) = \frac{(H-1-y)*R(W, -1) + (y+1)*P(W, H)}{H} \quad (7)$$

Once the neighboring pixels surrounding a current CU are defined, the horizontal and the vertical predictors ($P_h$(x,y) and $P_v$(x,y), respectively) for each pixel within the CU are determined according to equations (8) and (9) below.

$$P_h(x,y)=(W-1-x)*R(-1,y)+(x+1)*P_r(W,y) \quad (8)$$

$$P_v(x,y)=(H-1-y)*R(x,-1)+(y+1)*P_b(x,H) \quad (9)$$

Notice that in equations (8) and (9), $P_h$(x,y) and $P_v$(x,y) are shown as scaled up version of horizontal and vertical predictors. These factors will be compensated in the final predictor calculation step.

It may also be beneficial to use filtered version of neighboring pixels intensity, instead of actual neighboring pixel intensity for lifting part of the bottom right position adjustment. This is especially true when the coding content is noisy. An example of such filtering operation is described in equations (10) and (11).

$$R'(-1, H) = \frac{(R(-1, H-3) + 3*R(-1, H-2) + 5*R(-1, H-1) + 7*R(-1, H))}{16} \quad (10)$$

$$R'(W, -1) = \frac{(R(W-3, -1) + 3*R(W-2, -1) + 5*R(W-1, -1) + 7*R(W, -1))}{16} \quad (11)$$

Another example of filtering operation is described in equations (10a) and (11a).

$$R'(-1, H) = \frac{(R(-1, H+2) + 2*R(-1, H-1) + 5*R(-1, H))}{8} \quad (10a)$$

$$R'(W, -1) = \frac{(R(W-2, -1) + 2*R(W-1, -1) + 5*R(W, -1))}{8} \quad (11a)$$

The filtering operation may be selectively employed based on whether neighboring pixels have already been filtered by other prior process (such as mode dependent intra smoothing in HEVC). In embodiments, when neighboring pixels have not been filtered by prior task, the filtering operation is used. Otherwise, the filtering operation is not used.

Alternatively, it may be beneficial to set top-right and bottom-left corner positions to be R(W−1, −1) and R(−1, H−1), respectively. In this situation, interpolation for intermediate predictors can be described as an example by equations (12)-(16).

$$P(W-1, H-1) = (W*R(W-1, -1) + H*R(-1, H-1))/(H+W) \quad (12)$$

$$P_b(x, H-1) = \quad (13)$$
$$\frac{(W-1-x)*R(-1, H-1) + (x+1)*P(W-1, H-1)}{W}$$

$$P_r(W-1, y) = \quad (14)$$
$$\frac{(H-1-y)*R(W-1, -1) + (y+1)*P(W-1, H-1)}{H}$$

$$P_h(x, y) = (W-1-x)*R(-1, y) + (x+1)*P_r(W-1, y) \quad (15)$$

$$P_v(x, y) = (H-1-y)*R(x, -1) + (y+1)*P_b(x, H-1) \quad (16)$$

It is further proposed to utilize unequal weights for the final planar predictor calculation. In embodiments in which unequal weight is employed, an improvement may result from the accuracy of the input intensity in the final interpolation process. For example, in embodiments, larger weights are applied to the positions that are closer to more reliable neighboring positions.

In JVET, the processing order follows raster scan at CTU level and z-scan for CU within a CTU. Hence, the top row and the left column neighboring pixels are the actual reconstructed pixels and hence are more reliable than the bottom row and right column neighboring pixels (which are estimated ones). An example of unequal weight employed at the final predictor calculation is described in equation (17).

$$P(x,y)=((H*P_h(x,*(y+1)+W*(x,y)*(x+1)))/*W*(x+y+2))) \quad (17)$$

An example of unequal weight assignment shown in equation (17) can be generalized into a generic equation as shown in equation (18).

$$P(x,y)=(A(x,y)*P_h(x,y)+B(x,y)*P_v(x,y)+c(x,y))/(D(x,y)) \quad (18)$$

Where:
A(x,y) and B(x,y) are the position dependent weighting factors for horizontal and vertical predictors, respectively,
c(x,y) is a position dependent rounding factor, and
D(x,y) is a position dependent scaling factor.

Thus, unlike weights assigned to the horizontal and vertical predictors that are equal in the final predictor computation step, unequal weights are assigned to the horizontal and vertical predictors. In embodiments, the unequal weights assigned to the horizontal and vertical predictors is assigned for each predictor pixel within the coding unit. In embodiments, the unequal weights are assigned according to a distance ratio from a reliable neighboring pixel for each of the horizontal predictor and vertical predictor. In embodiments, the distance ratio is an approximation based on Euclidean distance using an "ordinary" straight-line distance between two points in Euclidean space, embodiments further including rounding.

Note that unequal weight assignment can also be used at the horizontal and vertical predictor computation phase as well. The bottom right position adjustment and unequal weight assignment components of the techniques disclosed herein can be used together or separately depending on codec design consideration.

For optimal coding performance, weighting factors and lifting process can be modified according to picture type (I, P, B, etc.), temporal layer, color component (Y, Cb, Cr, etc.). It is also possible to employ both weighted Planar prediction and HEVC Planar prediction for certain situation within a sequence; e.g., weighted Planar for I slice and HEVC Planar for P and B slices.

Many equations, e.g., (4), (6), (7) and (17), for the bottom right position adjustment process and unequal weight assignment process, respectively, involve division operations, which can be costly in terms of complexity. These division operations can be roughly converted into scale operations to make them implementation friendly, as described in equations (19), (20), (21) and (22).

$$P(W,H)=((W*R(W,-1)+H*R(-1,H))*S[W+H])\gg \text{shiftDenom} \quad (19)$$

$$P_b(x,H)=(((W-1-x)*R(-1,++1)*P(W,H))*S[W])\gg \text{shiftDenom} \quad (20)$$

$$P_r(W,y)=(((H-1-y)*R(W,-1)++1)*P(W,H))*S[H])\gg \text{ShiftDenom} \quad (21)$$

$$P(x,y)=((H*P_h(x,y)*(y+1)+W*P_v(x,y)*(x+1))*S[x+y+2])\gg(\text{ShiftDenom}+\log_2 W+\log_2 H) \quad (22)$$

Where:
S[n] is a weight of parameter n, and
» denotes a bit shift operation to the right
ShiftDenom is a factor for shifted down operation.
Specifically, S[n] may be an approximation of a factor $$\frac{1}{n},$$

and can be described as shown in equation (4).

$$S[n] = \text{Round}\left(\frac{(1 \ll \text{ShiftDenom})}{n}\right) \quad (4)$$

FIG. 10 is an example of S[n], where sum of width and height is 256 and ShiftDenom=10.

FIG. 11 illustrates another example of S[n], where the sum of the width and height is 512 and ShiftDenom=10.

In the two examples above, memory size of 2570 bits (257 entries with 10 bits each) and 5130 bits (513 entries with 10 bits each) are required to hold the weight tables. This memory size may be excessive and it may be beneficial to reduce this memory requirement. Two examples below are two possible ways to accomplish this requirement.

FIG. 12 illustrates another example of S[n], where sum of width and height is 128 and ShiftDenom=10.

FIG. 13 illustrates another example of S[n], where sum of width and height is 128 and ShiftDenom=9.

In the third and fourth examples, only 126 entries of 129 necessary are required to stored, since the first two entries (1/0 and 1/1) are not used in the proposed method. The third entry, representing ½, has value of 512 and 256 in the third and fourth examples, respectively, and it is handled separately during weight calculation. Weight average calculations shown in equations 20 and 21 will be modified as shown in equations 24 and 25 below.

$$P_b(x,H)=(((W-1-x)*R(-1,H)+(x+1)*P(W,H))*S[W-3])\gg \text{ShiftDenom} \quad (24)$$

$$P_r(W,y)=(((H-1-y)*R(W,-1)+(y+1)*P(W,H))*S[H-3])\gg \text{ShiftDenom} \quad (25)$$

Simple shift conversion used in Equation (22) does not provide accurate outputs resulting poor coding efficiency. The ineffectiveness is due to conversion process which allows error to accumulate linearly with distance. One way to reduce this error is to exploit the fact that weight for horizontal and vertical predictors are complimentary in (17) and hence the real weight can be computed based on that of horizontal or vertical predictor, whichever is more accurate.

An example of this approach is now described. First, parameters horWeight and verWeight are introduced and (22) can now be described as (26).

$$P(x, y) = ((H * P_h(x, y) * \text{horWeight} + W * P_v(x, y) * \text{verWeight})) \\ \gg (\text{ShiftDenom} + \log_2 W + \log_2 H) \quad (26)$$

$$\text{horWeight} = \begin{cases} (1 \ll \text{ShiftDenom}) - \text{verWeight} & \text{when } x < y \\ (y+1)*S[x+y+2] & \text{otherwise} \end{cases} \quad (27)$$

$$\text{verWeight} = \begin{cases} (x+1)*S[x+y+2] & \text{when } x < y \\ (1 \ll \text{ShiftDenom}) - \text{horWeight} & \text{otherwise} \end{cases} \quad (28)$$

Similar example is also given to handle weight tables given in examples 3 and 4.

$$P(x, y) = ((H * P_h(x, y) * \text{horWeight} + W * P_v(x, y) * \text{verWeight})) \\ \gg (\text{ShiftDenom} + \log_2 W + \log_2 H) \quad (26)$$

$$\text{horWeight} = \begin{cases} (1 \ll \text{ShiftDenom}) - \text{verWeight} & \text{when } x < y \\ (y+1)*S[x+y-1] & \text{when } x \geq y \end{cases} \quad (29)$$

-continued $$verWeight = \begin{cases} (x+1)*S[x+y-1] & \text{when } x < y \\ (1 << \text{ShiftDenom}) - \text{horWeight} & \text{otherwise} \end{cases} \quad (30)$$

$$\text{horWeight} - \text{verWeight} = (1 << (\text{ShiftDenom} - 1)) \text{ when } x = y = 0 \quad (31)$$

According to (6) and (7) above, the bottom row and right column neighboring lines of a current block are formed. The pixel values of these two lines are further used to compute the prediction of current block. Ideally, the pixels in these two lines are more reliable when they are close to R(W, −1) and R(−1, H) while those pixels close to the bottom right neighboring pixel of P(W,H) is less reliable.

Figure 14:
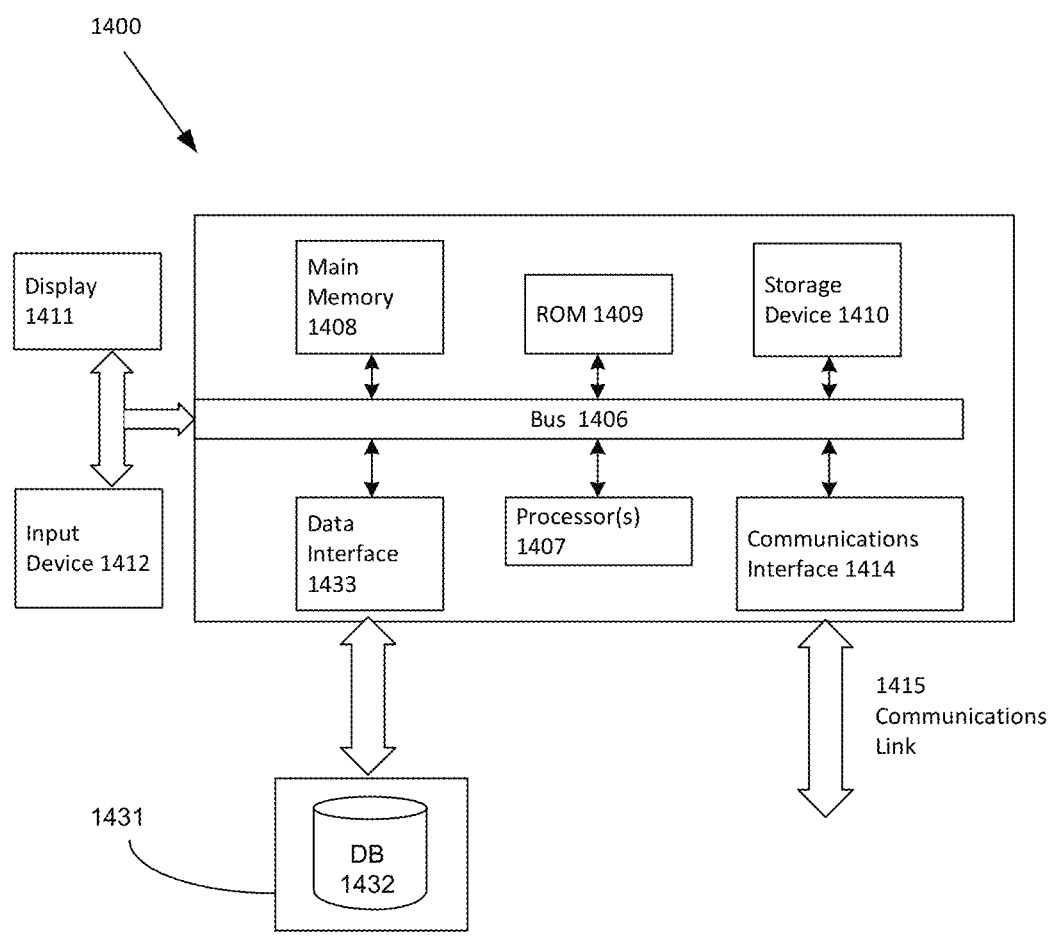
FIG. 14 depicts an embodiment of a computer system adapted and/or configured to process a method of CU coding.

The execution of the sequences of instructions required to practice the embodiments can be performed by a computer system 1400 as shown in FIG. 14. In an embodiment, execution of the sequences of instructions is performed by a single computer system 1400. According to other embodiments, two or more computer systems 1400 coupled by a communication link 1415 can perform the sequence of instructions in coordination with one another. Although a description of only one computer system 1400 will be presented below, however, it should be understood that any number of computer systems 1400 can be employed to practice the embodiments.

A computer system 1400 according to an embodiment will now be described with reference to FIG. 14, which is a block diagram of the functional components of a computer system 1400. As used herein, the term computer system 1400 is broadly used to describe any computing device that can store and independently run one or more programs.

Each computer system 1400 can include a communication interface 1414 coupled to the bus 1406. The communication interface 1414 provides two-way communication between computer systems 1400. The communication interface 1414 of a respective computer system 1400 transmits and receives electrical, electromagnetic or optical signals, which include data streams representing various types of signal information, e.g., instructions, messages and data. A communication link 1415 links one computer system 1400 with another computer system 1400. For example, the communication link 1415 can be a LAN, in which case the communication interface 1414 can be a LAN card, or the communication link 1415 can be a PSTN, in which case the communication interface 1414 can be an integrated services digital network (ISDN) card or a modem, or the communication link 1415 can be the Internet, in which case the communication interface 1414 can be a dial-up, cable or wireless modem.

A computer system 1400 can transmit and receive messages, data, and instructions, including program, i.e., application, code, through its respective communication link 1415 and communication interface 1414. Received program code can be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, which include data streams representing various types of signal information, e.g., instructions, messages and data. In embodiments, the functions of the data interface 1433 can be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random-access memory (RAM) or other dynamic storage device, coupled to the bus 1406 for storing dynamic data and instructions to be executed by the processor(s) 1407. The main memory 1408 also can be used for storing temporary data, i.e., variables, or other intermediate information during execution of instructions by the processor(s) 1407.

The computer system 1400 can further include a read only memory (ROM) 1409 or other static storage device coupled to the bus 1406 for storing static data and instructions for the processor(s) 1407. A storage device 1410, such as a magnetic disk or optical disk, can also be provided and coupled to the bus 1406 for storing data and instructions for the processor(s) 1407.

A computer system 1400 can be coupled via the bus 1406 to a display device 1411, such as, but not limited to, a cathode ray tube (CRT) or a liquid-crystal display (LCD) monitor, for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions can be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry can be used in place of or in combination with software instructions. Thus, embodiments are not limited to any specific combination of hardware circuitry and/or software.

Figure 15A:
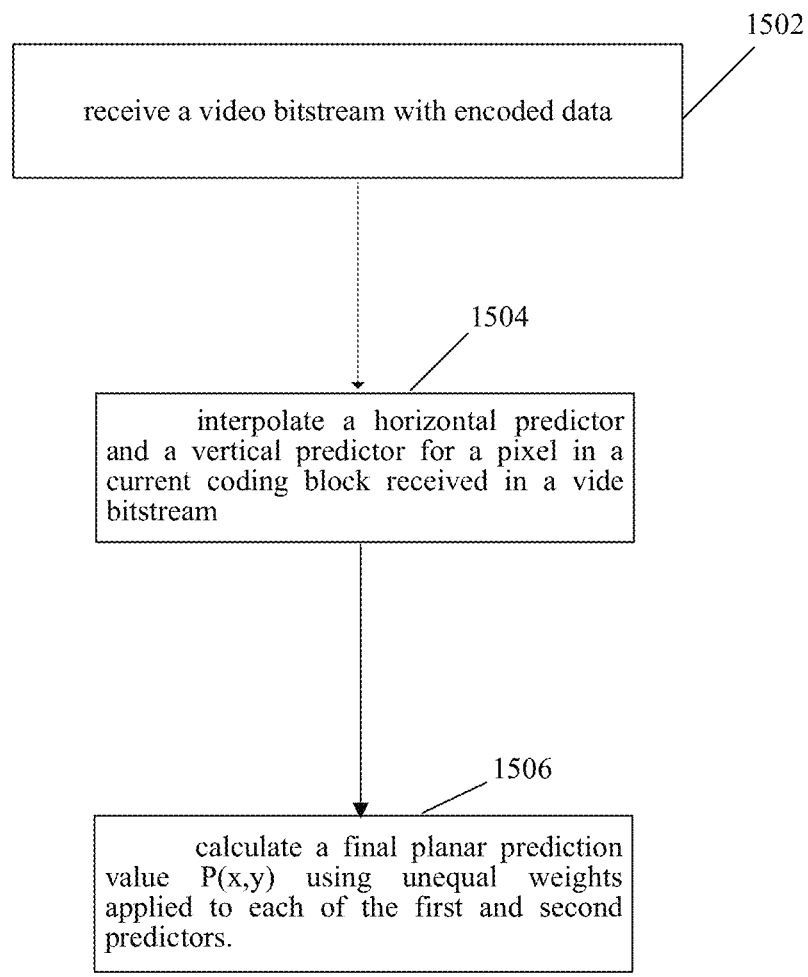
FIG. 15A is a flow diagram that illustrates a method for calculating an intensity value of a bottom right neighboring pixel of a current coding block.

The term "computer-usable medium," as used herein, refers to any medium that provides information or is usable by the processor(s) 1407. Such a medium can take many forms, including, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that cannot retain information in the absence of power, includes the main memory 1408. Transmission media includes coaxial cables, copper wire and fiber optics, including the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high-level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Cs FIG. 15A is a flow diagram that illustrates a method for performing the disclosed techniques, but it should be understood that the techniques described herein with respect to the remaining figures similarly capture the methods available using the disclosed techniques. As illustrated in FIG. 15A, the method includes calculating a final planar prediction in planar mode to predict pixel values for a current coding block having height H, width W, and a top-left (TL) pixel within the current coding block is defined by coordinates x=0 and y=0. At 1502, a decoding software or hardware module receives a video bitstream with encoded data. The method at 1504 comprises interpolating a horizontal predictor and a vertical predictor for a pixel in a current coding block received in a vide bitstream. At 1506, a final planar prediction value P(x,y) may be calculated using unequal weights applied to each of the first and second predictors. The final planar prediction value may be determined in accordance with $P(x,y)=(A(x,y)*P_h(x,y)+B(x,y)*P_v(x,y)+c(x,y))/(D(x,y))$, where A(x,y) and B(x,y) are position dependent weighting factors for the horizontal and vertical predictors, respectively, c(x,y) is a position dependent rounding factor, and D(x,y) is a position dependent scaling factor.

Figure 15B:
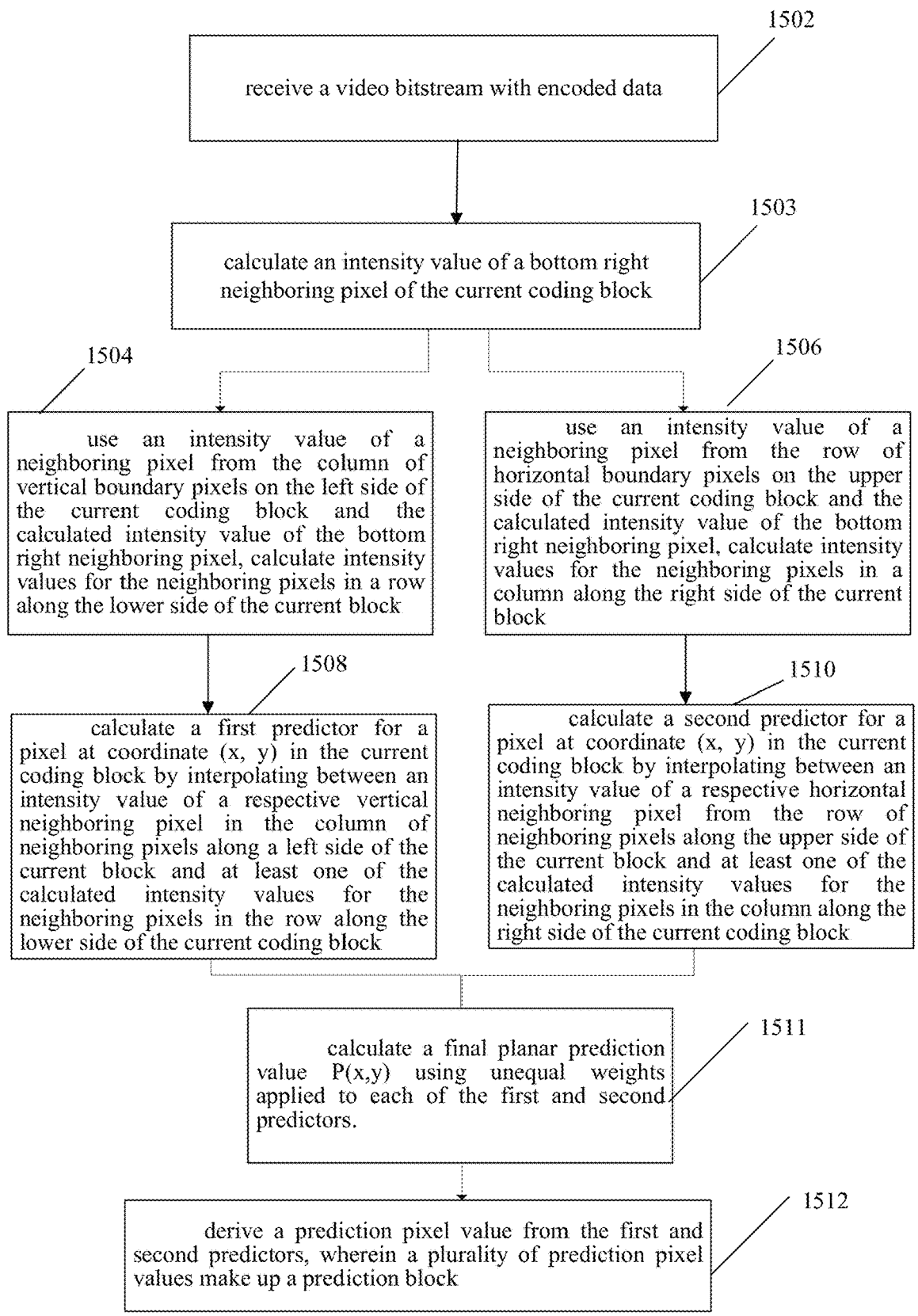
FIG. 15B depicts a flow diagram for using the unequal weight planar prediction disclosed herein with a calculated intensity value of a bottom right neighboring pixel of the current coding block.

FIG. 15B depicts a flow diagram for using the unequal weight planar prediction described herein and illustrated in FIG. 15A using a calculated intensity value of a bottom right neighboring pixel of the current coding block. As illustrated in FIG. 15B, following receipt of a video bitstream with encoded data at 1502, the method may include calculating at 1503 an intensity value of a bottom right neighboring pixel of the current coding block, such as a coding unit or a luma or chroma block. At 1504, the bottom right intensity value can be used with a neighboring pixel from the column of vertical boundary pixels on the left side of the current coding block to calculate intensity values for the neighboring pixels in a row along the lower side of the current block. At 1506, the bottom right intensity value can be used with an intensity value of a neighboring pixel from the row of horizontal boundary pixels on the upper side of the current coding block to calculate intensity values for the neighboring pixels in a column along the right side of the current block. The method at 1508 and 1510 further comprises calculating a first and second predictor and, at 1511, a final planar prediction value P(x,y) may be calculated using unequal weights applied to each of the first and second predictors. The final planar prediction value may be determined in accordance with $P(x,y)=(A(x,y)*P_h(x,y)+B(x,y)*P_v(x,y)+c(x,y))/(D(x,y))$, where A(x,y) and B(x,y) are position dependent weighting factors for the horizontal and vertical predictors, respectively, c(x,y) is a position dependent rounding factor, and D(x,y) is a position dependent scaling factor. At 1512, the prediction pixel values of the coding block may be predicted.

Figure 16:
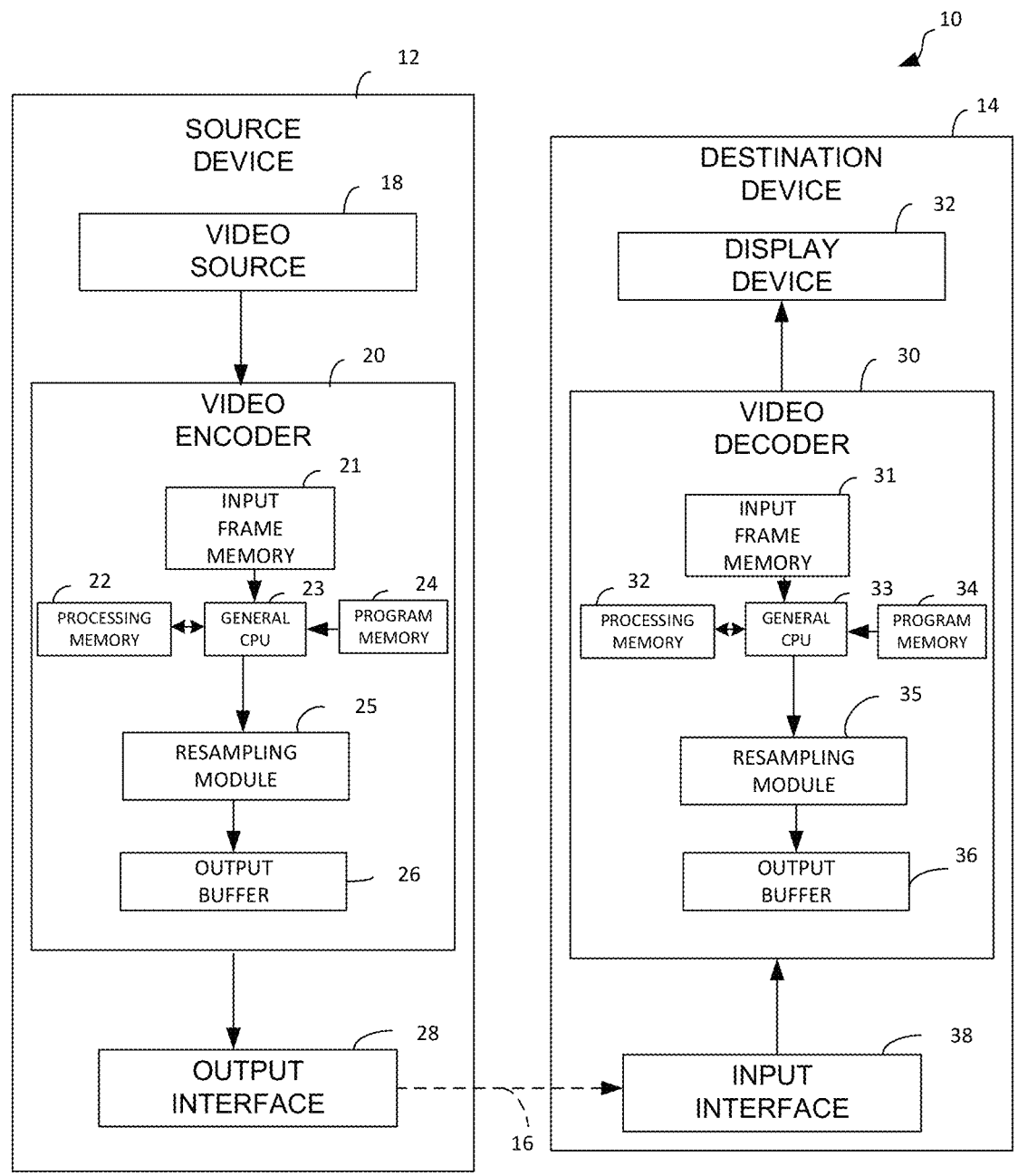
FIG. 16 is a high-level view of a source device and destination device that may incorporate features of the systems and devices described herein.

FIG. 16 is a high-level view of a source device 12 and destination device 10 that may incorporate features of the systems and devices described herein. As shown in FIG. 16, example video coding system 10 includes a source device 12 and a destination device 14 where, in this example, the source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 16, source device 12 includes a video source 18, video encoder 20, and an output interface 22. In some cases, output interface 28 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. An input image may be received by the video encoder 20 and stored in the input frame memory 21. The general-purpose processor 23 may load information from here and perform encoding. The program for driving the general-purpose processor may be loaded from a storage device, such as the example memory modules depicted in FIG. 16. The general-purpose processor may use processing memory 22 to perform the encoding, and the output of the encoding information by the general processor may be stored in a buffer, such as output buffer 26.

The video encoder 20 may include a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters.

The encoded video data, e.g., a coded bit stream, may be transmitted directly to destination device 14 via output interface 28 of source device 12. In the example of FIG. 16, destination device 14 includes an input interface 38, a video decoder 30, and a display device 32. In some cases, input interface 28 may include a receiver and/or a modem. Input interface 38 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

The encoded video data may also be stored onto a storage medium or a file server for later access by destination device 14 for decoding and/or playback. For example, the coded bitstream may be temporarily stored in the input buffer 31, then loaded in to the general-purpose processor 33. The program for driving the general-purpose processor may be loaded from a storage device or memory. The general-purpose processor may use a process memory 32 to perform the decoding.

FIG. 16 depicts the resampling module 35 separately from the general-purpose processor 33, but it would be appreciated by one of skill in the art that the resampling function may be performed by a program executed by the general-purpose processor, and the processing in the video encoder may be accomplished using one or more processors. The decoded image(s) may be stored in the output frame buffer 36 and then sent out to the input interface 38.

Display device 38 may be integrated with or may be external to destination device 14. In some examples, destination device 14 may include an integrated display device and may also be configured to interface with an external display device. In other examples, destination device 14 may be a display device. In general, display device 38 displays the decoded video data to a user.

Video encoder 20 and video decoder 30 may operate according to a video compression standard. ITU-T VCEG (Q6/16) and ISO/IEC MPEG (JTC 1/SC 29/WG 11) are studying the potential need for standardization of future video coding technology with a compression capability that significantly exceeds that of the current High Efficiency Video Coding HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 20 and video decoder 30 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general-purpose processors 23 and 33 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 23 and 33.

A storage device may also store instructions, instructions, such as source code or binary code, for performing the techniques described above. A storage device may additionally store data used and manipulated by the computer processor. For example, a storage device in a video encoder 20 or a video decoder 30 may be a database that is accessed by computer system 23 or 33. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although the subject matter has been described in language specific to structural features and/or methodological acts, it is to be understood that the subject matter defined in the appended claims is not necessarily limited to the specific features or acts described above.

Although embodiments have been disclosed herein in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. A method for using planar mode to predict pixel values for a current coding block having height H, width W, and a top-left (TL) pixel within the current coding block is defined by coordinates x=0 and y=0, where constructed or reconstructed neighboring pixels form rows of horizontal boundary pixels on an upper side of the current coding block and constructed or reconstructed neighboring pixels form a column of vertical boundary pixels on a left side of the current coding block, the method configured to:

calculate an intensity value of a bottom right neighboring pixel of the current coding block;

using the calculated bottom right neighboring pixel value, calculate intensity values for the neighboring pixels in a row along the lower side of the current coding block and in a column along the right side of the current coding block;

calculate a horizontal predictor $P_h(x,y)$ and a vertical predictor $P_v(x,y)$ for a pixel at coordinate (x,y) in the current coding block by interpolating between corresponding neighboring pixels in neighboring rows and by interpolating between corresponding neighboring pixels in neighboring columns, respectively;

calculating a final planar prediction P(x,y) using unequal weights applied to each of the horizontal and vertical predictors, respectively, is determined in accordance with:

$$P(x,y)=(A(x,y)*P_h(x,y)+B(x,y)*P_v(x,y)+c(x,y))/(D(x,y))$$

where A(x,y) and B(x,y) are position dependent weighting factors for the horizontal and vertical predictors, respectively, c(x,y) is a position dependent rounding factor, and D(x,y) is a position dependent scaling factor.

2. The method of claim 1, wherein unequal weights A(x,y) and B(x,y) are assigned for prediction of each pixel within the coding block.

3. The method of claim 1, wherein unequal weights A(x,y) and B(x,y) are each assigned to a distance ratio from a reliable neighboring pixel for each of the horizontal predictor and the vertical predictor.

4. The method of claim 1, further comprising applying unequal weights to at least one of the horizontal predictor and/or the vertical predictor.

5. The method of claim 1, further comprising applying unequal weights at horizontal and vertical predictor computations.

6. The method of claim 1, using bottom right position adjustment and unequal weight assignment in combination.

7. A method for calculating a final planar prediction in planar mode to predict pixel values for a current coding block having height H, width W, and a top-left (TL) pixel within the current coding block is defined by coordinates x=0 and y=0, the method comprising:

receiving a video bitstream including encoded video data;

from the encoded video data, reconstructing neighboring pixels that form a row of horizontal boundary pixels on an upper side of the current coding block and reconstructing neighboring pixels that form a column of vertical boundary pixels on a left side of the current coding block;

calculating a first predictor for a pixel at coordinate (x,y) in the current coding block by interpolating between an intensity value of a respective horizontal neighboring pixel in the row of neighboring pixels along the upper side of the current coding block and an intensity value of at least one replicated neighboring pixels in the row along the lower side of the current coding block;

calculate a second predictor for the pixel at coordinate (x,y) in the current coding block by interpolating between an intensity value of a respective vertical neighboring pixel from the column of neighboring pixels along the left side of the current coding block and an intensity value of at least one replicated neighboring pixel in the column along the right side of the current coding block;

calculating a final planar prediction P(x,y) using unequal weights applied to each of the first and second predictors is determined in accordance with:

$$P(x,y)=(A(x,y)*P_h(x,y)+B(x,y)*(x,y)+c(x,y))/(D(x,y))$$

where A(x,y) and B (x,y) are position dependent weighting factors for horizontal and vertical predictors, respectively, c(x,y) is a position dependent rounding factor, and D(x,y) is a position dependent scaling factor.

* * * * *